US012580317B2

(12) United States Patent
Chang et al.

(10) Patent No.: US 12,580,317 B2

(45) Date of Patent: Mar. 17, 2026

(54) DIPOLE ANTENNA

(71) Applicant: LUXSHARE PRECISION INDUSTRY COMPANY LIMITED, Shenzhen (CN)

(72) Inventors: Yao-Yuan Chang, Taipei City (TW); Yu-Tsung Wang, Taipei City (TW); Wei-Hsin Chen, Taipei City (TW)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 96 days.

(21) Appl. No.: 18/806,905

(22) Filed: Aug. 16, 2024

(65) Prior Publication Data

US 2025/0357673 A1 Nov. 20, 2025

(30) Foreign Application Priority Data

May 14, 2024 (CN) ........................ 202421045077.6

(51) Int. Cl.
*H01Q 9/28* (2006.01)
*H01Q 1/38* (2006.01)

(52) U.S. Cl.
CPC ............... *H01Q 9/285* (2013.01); *H01Q 1/38* (2013.01)

(58) Field of Classification Search
USPC ........................................................ 343/795
See application file for complete search history.

(56) References Cited

U.S. PATENT DOCUMENTS

| | | | | |
|---|---|---|---|---|
| 6,300,906 | B1 * | 10/2001 | Rawnick | H01Q 1/38 343/700 MS |
| 9,837,722 | B2 * | 12/2017 | Minard | H01Q 1/38 |
| 2013/0069837 | A1 * | 3/2013 | Cozzolino | H01Q 13/10 343/727 |
| 2015/0325920 | A1 * | 11/2015 | Urso | H01Q 9/27 343/795 |
| 2019/0372212 | A1 * | 12/2019 | Kirknes | H01Q 9/285 |

FOREIGN PATENT DOCUMENTS

| | | | | |
|---|---|---|---|---|
| CN | 203351741 U | | 12/2013 | |
| CN | 106415929 A | | 2/2017 | |
| CN | 211238488 U | | 8/2020 | |
| CN | 214280204 U | | 9/2021 | |
| DE | 102010019904 A1 | * | 11/2011 | H01Q 1/362 |
| TW | I474560 B | | 2/2015 | |

* cited by examiner

*Primary Examiner* — Dimary S Lopez Cruz
*Assistant Examiner* — Brandon Sean Woods
(74) *Attorney, Agent, or Firm* — Birch, Stewart, Kolasch & Birch, LLP

(57) ABSTRACT

A dipole antenna comprising a dielectric carrier board, a radiating structure, and a coaxial cable is disclosed. The dielectric carrier board includes a carrier board surface. The radiating structure is arranged on the carrier board surface and includes a first radiator, a second radiator, and a Balun line. The first radiator includes a first short segment and a first long segment, arranged side by side on one side of the Balun line, with the first long segment extending away from it. The second radiator includes a second short segment and a second long segment, arranged side by side on the other side of the Balun line, with the second long segment extending away from it. The Balun line connects the first and second short segments. The inner conductor of the coaxial cable connects to the second radiator.

23 Claims, 10 Drawing Sheets

DIPOLE ANTENNA

CROSS-REFERENCE TO RELATED APPLICATIONS

This non-provisional application claims priority claim under 35 U.S.C. § 119(a) on Chinese Patent Application No. 202421045077.6 filed May 14, 2024, the entire contents of which are hereby incorporated by reference.

BACKGROUND

1. Technical Field

The present application relates to the field of wireless communication technology, and specifically, to a dipole antenna.

2. Description of the Related Art

Antennas used for transmitting and receiving radio frequency signals are critical components in wireless communication devices. To achieve better communication quality, wireless communication devices typically employ dipole antennas with good antenna characteristics and omnidirectional radiation patterns.

With the rapid development of wireless radio frequency technology, dipole antennas configured in wireless communication devices need to support multi-frequency applications. Most dipole antennas on the market are dual-frequency dipole antennas, which only support the 2.4 GHz (2.4-2.5 GHz) and 5 GHz (5.15-5.85 GHz) frequency bands. However, with the advancement of technology, applications have been expanded to include the 6 GHz (5.925-7.125 GHz) frequency band. Yet, most dipole antenna designs on the market still only support the 2.4 GHz and 5 GHz bands. Therefore, providing a dipole antenna capable of simultaneously supporting the 6 GHz band is a problem that current professionals in the field need to solve.

SUMMARY

The embodiments of the present application provide a dipole antenna to address the issue where current dipole antennas on the market cannot simultaneously support the 2.4 GHz, 5 GHz, and 6 GHz frequency bands.

To solve the above technical problem, the present application implements the following solution:

In a first aspect, a dipole antenna is provided, which includes a dielectric carrier board, a radiating structure, and a coaxial cable. The dielectric carrier board includes a carrier board surface. The radiating structure is disposed on the carrier board surface. The radiating structure includes a first radiator, a second radiator, and a Balun line. The Balun line is positioned between the first radiator and the second radiator. The first radiator includes a first short segment and a first long segment, which are arranged side by side and adjacent to one side of the Balun line. The first long segment extends in a direction away from the Balun line. The second radiator includes a second short segment and a second long segment, which are arranged side by side and adjacent to the other side of the Balun line. The second long segment extends in a direction away from the Balun line. The position of the first short segment corresponds to the position of the second long segment, and the position of the first long segment corresponds to the position of the second short segment. The two ends of the Balun line are respectively connected between the first short segment and the second short segment, or between the first long segment and the second long segment on both sides. The coaxial cable includes an inner conductor and an outer conductor. The outer conductor is located outside the inner conductor. The inner conductor is electrically connected to the second radiator, and the outer conductor is electrically connected to the first radiator.

In one embodiment, the dielectric carrier board has a first side, a second side, a third side, and a fourth side. The long sides of the radiating structure are respectively the first side and the second side. The end side adjacent to one end of the first radiator is the third side, and the end side adjacent to one end of the second radiator is the fourth side. The first short segment is adjacent to the first side, the first long segment is adjacent to the second side, the second long segment is adjacent to the first side, and the second short segment is adjacent to the second side.

In one embodiment, the outer edge of the first short segment is disposed along the first side. The outer edge of the first long segment extends along the second side and the third side. The outer edge of the first long segment extends to the corner between the third side and the first side. The outer edge of the second long segment extends along the first side and the fourth side. The outer edge of the second long segment extends to the corner between the fourth side and the second side. The outer edge of the second short segment is disposed along the first side.

In one embodiment, the inner edge of the first short segment is connected to the inner edge of the first long segment. The inner edge of the first short segment adjacent to the Balun line and the inner edge of the first long segment form a first curved edge. The inner edge of the first long segment adjacent to the third side forms a second curved edge.

In one embodiment, the inner edge of the second long segment is connected to the inner edge of the second short segment. The inner edge of the second long segment adjacent to the Balun line and the inner edge of the second short segment form a third curved edge. The inner edge of the second long segment adjacent to the fourth side forms a fourth curved edge.

In one embodiment, the inner edge of the second long segment is connected to the inner edge of the second short segment. The inner edge of the second long segment adjacent to the Balun line and the inner edge of the second short segment form a third curved edge. The inner edge of the second long segment adjacent to the fourth side forms a fourth curved edge.

In one embodiment, the end side of the first short segment that is distal from the second radiator is a first short side, and the end side of the second short segment that is distal from the first radiator is a second short side. The lengths of the first short side and the second short side are the same.

In one embodiment, the length of the first short side and the second short side ranges from 2.5 mm to 3.5 mm.

In one embodiment, the outer edge of the first long segment extending to the side of the first side is the first long side, and the outer edge of the second long segment extending to the side of the second side is the second long side. The lengths of the first long side and the second long side are the same.

In one embodiment, the length of the first long side and the second long side ranges from 2 mm to 4 mm.

In one embodiment, the Balun line comprises a main segment, a first connecting segment, and a second connecting segment. Both ends of the main segment are respectively connected to the first connecting segment and the second connecting segment. The first connecting segment and the second connecting segment are perpendicular to the main segment.

In one embodiment, the first connecting segment is connected to the first short segment, and the second connecting segment is connected to the second short segment. The first connecting segment extends along the outer side of the first short segment, with one end of the first connecting segment connected to the first short segment. The inner side of the first connecting segment and the first short segment form a first channel. The second connecting segment extends along the outer side of the second short segment, with one end of the second connecting segment connected to the second short segment. The inner side of the second connecting segment and the second short segment form a second channel.

In one embodiment, the length of the first channel and the second channel ranges from 0 to 6 mm.

In one embodiment, the first connecting segment is connected to the second long segment, and the second connecting segment is connected to the first long segment. The first connecting segment extends along the outer side of the second long segment, with one end of the first connecting segment connected to the second long segment. The inner side of the first connecting segment and the second long segment form a third channel. The second connecting segment extends along the outer side of the first long segment, with one end of the second connecting segment connected to the first long segment. The inner side of the second connecting segment and the first long segment form a fourth channel.

In one embodiment, the length of the third channel and the fourth channel ranges from 0 to 6 mm.

In one embodiment, a first gap is present between the main segment of the Balun line and the first radiator, and a second gap is present between the main segment of the Balun line and the second radiator. The spacing distance of the first gap is the same as that of the second gap.

In one embodiment, the length ratio of the first radiator to the second radiator ranges from 1.1:0.9 to 0.9:1.1.

In one embodiment, the first short segment and the second short segment generate a second resonant mode, and the first long segment and the second long segment generate a first resonant mode and a third resonant mode.

In one embodiment, the first radiator and the second radiator have the same structure but are inverted vertically and flipped horizontally relative to each other.

In one embodiment, the first radiator, the second radiator, and the Balun line are formed on the carrier board surface of the dielectric carrier board by printing, and the first radiator, the second radiator, and the Balun line are integrally formed.

In one embodiment, one end of the coaxial cable extends from the outside of the dielectric carrier board to above the carrier board surface of the dielectric carrier board, and this end of the coaxial cable is connected to the radiating structure.

In one embodiment, one end of the coaxial cable extends perpendicularly from the long side of the dielectric carrier board to a point above the carrier board surface of the dielectric carrier board and is bent 90 degrees to connect to the radiating structure.

In one embodiment, the coaxial cable further includes a first insulating layer and a second insulating layer. The first insulating layer covers part of the surface of the inner conductor, leaving one end of the inner conductor exposed, and the exposed inner conductor is electrically connected to the second radiator. The outer conductor covers part of the surface of the first insulating layer, and the second insulating layer covers part of the surface of the outer conductor, leaving part of the outer conductor exposed, and the exposed outer conductor is electrically connected to the first radiator.

In one embodiment, the first radiator and the second radiator are on the same plane or form a relative angle.

In the embodiments of the present application, the first radiator, the second radiator, and the Balun line are spaced on the carrier board surface of the dielectric carrier board such that the Balun line is positioned between the first radiator and the second radiator, the inner conductor of the coaxial cable is electrically connected to the second radiator, and the outer conductor of the coaxial cable is electrically connected to the first radiator. The two ends of the Balun line are respectively connected between the first short segment of the first radiator and the second short segment of the second radiator such that the first short segment of the first radiator and the second short segment of the second radiator generate a second resonant mode (5 GHz), and the first long segment of the first radiator and the second long segment of the second radiator generate a first resonant mode (2.4 GHz) and a third resonant mode (6 GHz). Therefore, the dipole antenna of the embodiments of the present application can meet the communication requirements of the 2.4 GHz, 5 GHz, and 6 GHz frequency bands, has a reduced overall size, has a simple structure, is easy to fabricate, and can be applied to a variety of wireless communication devices.

BRIEF DESCRIPTION OF THE DRAWINGS

The accompanying drawings presented herein serve to deepen the understanding of the present application and are an integral part thereof. The illustrative embodiments and their explanations are provided to elucidate the present application and do not impose any undue limitations on it. In the drawings.

DETAILED DESCRIPTION OF THE EMBODIMENTS

Figure 1:
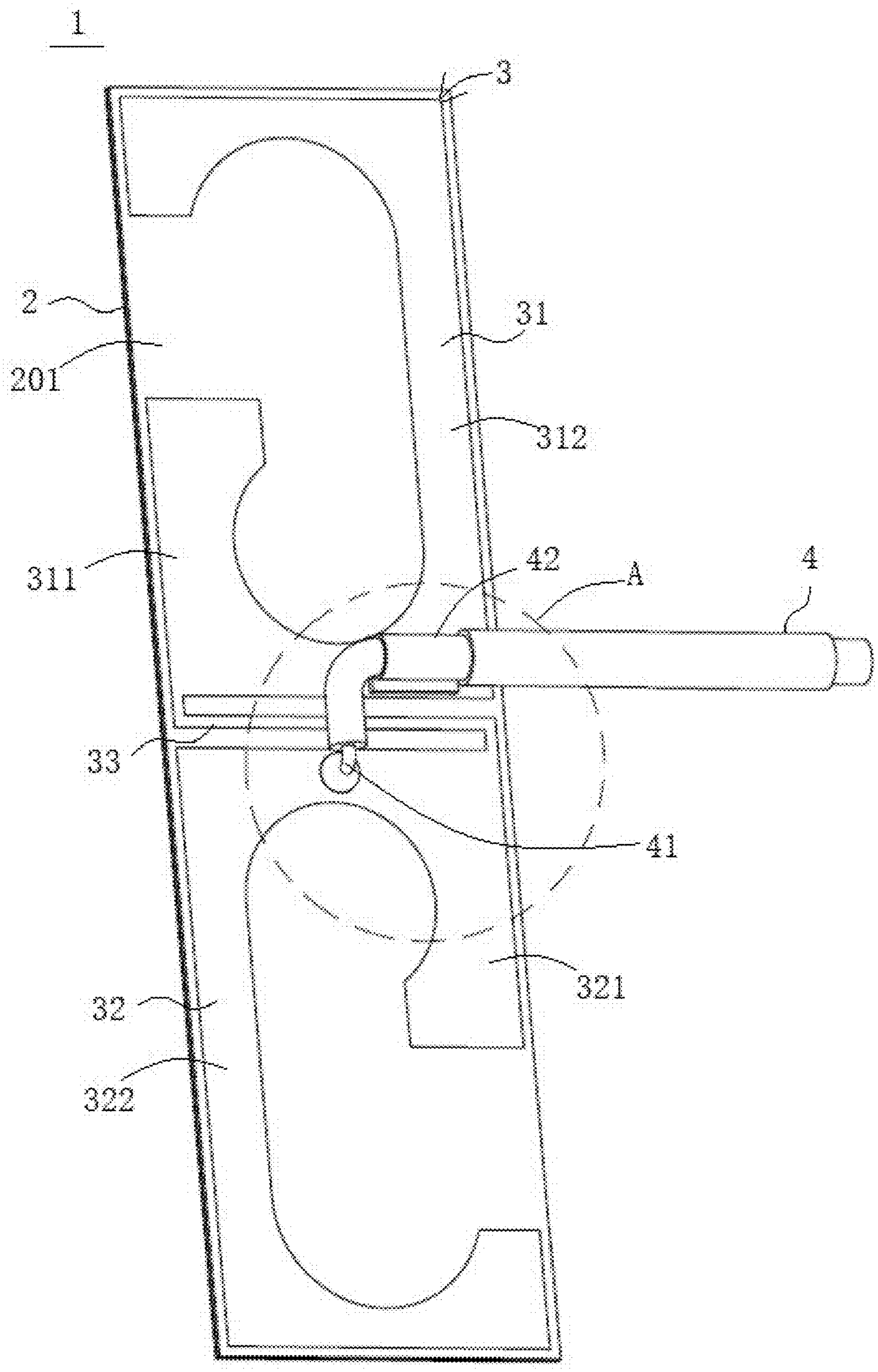
FIG. 1 is a perspective view of the dipole antenna according to the first embodiment of the present application.

The following describes the embodiments of the present application in conjunction with the relevant drawings. In these drawings, the same reference numerals denote the same or similar components or method flows.

It should be understood that the terms "comprising," "including," and the like as used in this specification are intended to indicate the presence of specific technical features, numerical values, method steps, operations, and/or components, but do not exclude the possibility of adding more technical features, numerical values, method steps, operations, components, or any combination of the above.

It should be understood that when a component is described as being "connected" or "coupled" to another component, it can be directly connected or coupled to the other component, or there may be intermediary components. Conversely, when a component is described as being "directly connected" or "directly coupled" to another component, there are no intermediary components present.

Additionally, although terms such as "first," "second," and so on are used herein to describe various elements, these terms are merely for distinguishing elements described by the same technical term or operation.

Moreover, for ease of description, spatially relative terms such as "below," "beneath," "above," "over," and the like may be used to describe a relationship of one element or feature to another element or feature as illustrated in the FIGs.

Figure 2:
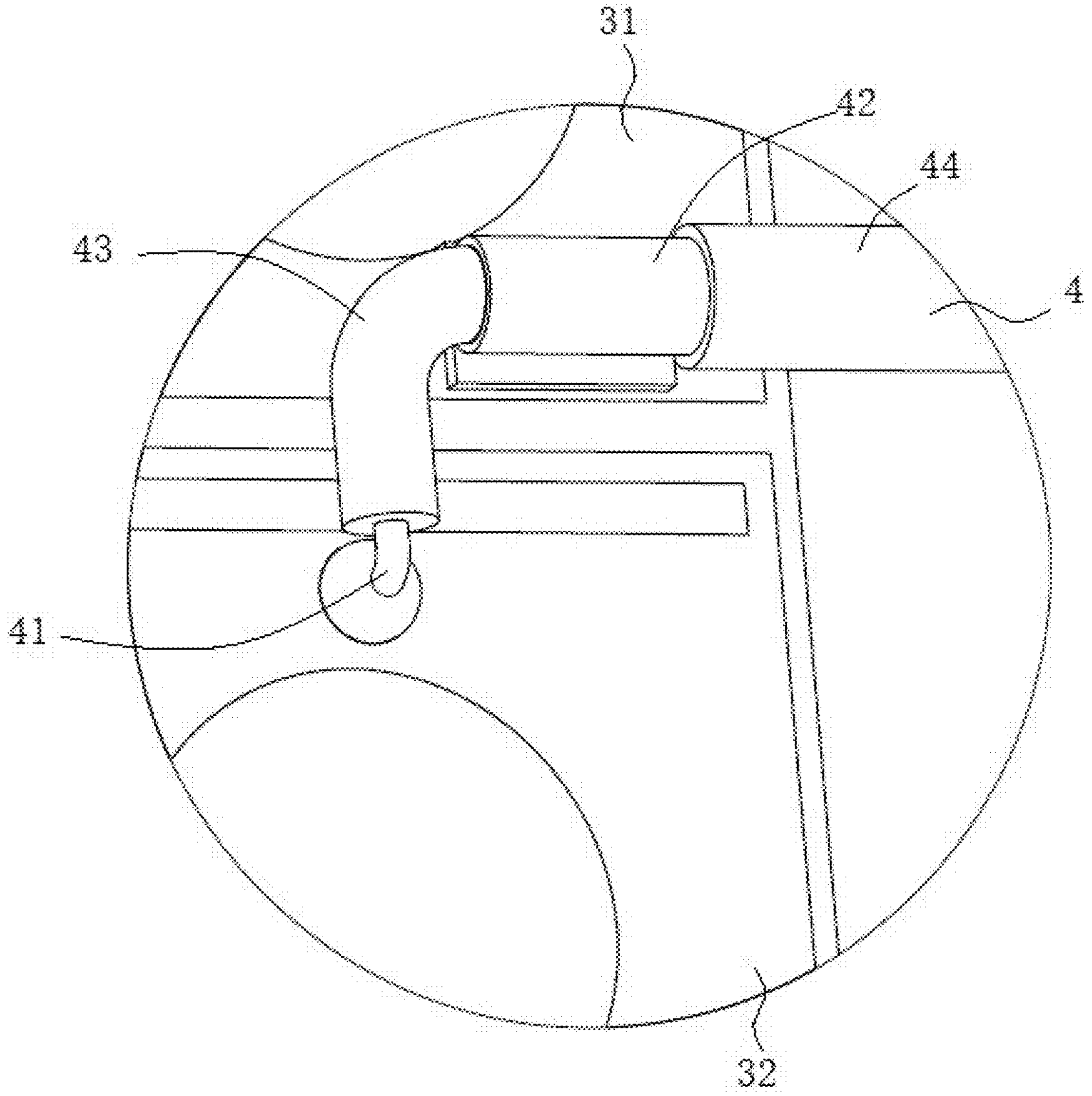
FIG. 2 is an enlarged partial view at A according to FIG. 1.

Please refer to FIG. 1 and FIG. 2, where FIG. 1 is a perspective view of the dipole antenna of the first embodiment of the present application and FIG. 2 is an enlarged partial view at A according to FIG. 1. As shown in the FIG. 1 and FIG. 2, the dipole antenna 1 of the present embodiment is mainly applied in products such as wireless routers (AP Routers), the Internet of Things, and wireless networking. In this embodiment, the dipole antenna 1 includes a dielectric carrier board 2, a radiating structure 3, and a coaxial cable 4. The dielectric carrier board 2 can be, but is not limited to, a Flame Retardant 4 (FR4) substrate, a Printed Circuit Board (PCB), or a Flexible Printed Circuit (FPC). The dielectric carrier board 2 includes a carrier board surface 201. The radiating structure 3 is disposed on the carrier board surface 201. The radiating structure 3 includes a first radiator 31, a second radiator 32, and a Balun line 33. The first radiator 31, second radiator 32, and Balun line 33 are all planar structures and can be made of metal materials such as copper, silver, aluminum, iron, or their alloys. Therefore, the first radiator 31, second radiator 32, and Balun line 33 can be formed on the carrier board surface 201 of the dielectric carrier board 2 by printing, and the first radiator 31, second radiator 32, and Balun line 33 are integrally formed to facilitate processing. The first radiator 31 and the second radiator 32 are on the same plane, meaning that the carrier board surface 201 is a planar structure, and the first radiator 31 and the second radiator 32 are located on this planar structure. The Balun line 33 is positioned between the first radiator 31 and the second radiator 32. The first radiator 31 is located above the Balun line 33, and the second radiator 32 is located below the Balun line 33.

As mentioned above, the first radiator 31 includes a first short segment 311 and a first long segment 312. The first short segment 311 and the first long segment 312 are arranged side by side and adjacent to one side of the Balun line 33, and the first long segment 312 extends in a direction away from the Balun line 33. The second radiator 32 includes a second short segment 321 and a second long segment 322. The second short segment 321 and the second long segment 322 are arranged side by side and adjacent to the other side of the Balun line 33, and the second long segment 322 extends in a direction away from the Balun line 33. The position of the first short segment 311 corresponds to the position of the second long segment 322, meaning that the position of the first short segment 311 and the position of the second long segment 322 are respectively on opposite sides of the Balun line 33, and the line connecting the position of the first short segment 311 and the position of the second long segment 322 is perpendicular to the Balun line 33. The position of the first long segment 312 corresponds to the position of the second short segment 321, meaning that the position of the first long segment 312 and the position of the second short segment 321 are respectively on opposite sides of the Balun line 33, and the line connecting the position of the first long segment 312 and the position of the second short segment 321 is perpendicular to the Balun line 33. Both ends of the Balun line 33 are respectively connected between the first short segment 311 and the second short segment 321, as shown in FIG. 1, where one end of the Balun line 33 is connected to the left end of the first short segment 311 (the end farthest from the second short segment 321), and the other end of the Balun line 33 is connected to the right end of the second short segment 321 (the end farthest from the first short segment 311). The first radiator 31, the second radiator 32, and the Balun line 33 form a feed structure with a Balun design, causing the first short segment 311 of the first radiator 31 and the second short segment 321 of the second radiator 32 to generate a second resonant mode (5 GHz). The coaxial cable 4 includes an inner conductor 41 and an outer conductor 42. The outer conductor 42 is located outside the inner conductor 41. The inner conductor 41 is electrically connected to the second radiator 32, and the outer conductor 42 is electrically connected to the first radiator 31, causing the first long segment 312 of the first radiator 31 and the second long segment 322 of the second radiator 32 to generate a first resonant mode (2.4 GHz) and a third resonant mode (6 GHz), achieving good high and low-frequency matching.

In this embodiment, one end of the coaxial cable 4 extends from the outside of the dielectric carrier board 2 into the carrier board surface 201 of the dielectric carrier board 2, and one end of the coaxial cable 4 is connected to the radiating structure 3. The end of the coaxial cable 4 extends orthogonally from one long side of the dielectric carrier board 2 into the carrier board surface 201 of the dielectric carrier board 2 and bends 90 degrees to connect to the radiating structure 3, where the end of the coaxial cable 4 can be bent towards the first radiator 31 or the second radiator 32, depending on the user's needs. The coaxial cable 4 also includes a first insulating layer 43 and a second insulating layer 44. The first insulating layer 43 covers part of the surface of the inner conductor 41, exposing one end of the inner conductor 41, which is electrically connected to the second radiator 32. The outer conductor 42 covers part of the surface of the first insulating layer 43, and the second insulating layer 44 covers part of the surface of the outer conductor 42, exposing part of the outer conductor 42, which is electrically connected to the first radiator 31.

Please refer to FIG. 2. In this embodiment, the end of the coaxial cable 4 with the exposed inner conductor 41 and the exposed outer conductor 42 extends from the side of the dielectric carrier board 2 into the carrier board surface 201 of the dielectric carrier board 2 and bends downward 90 degrees. The exposed inner conductor 41 is electrically connected to the second radiator 32, and the exposed outer conductor 42 is electrically connected to the first radiator 31. Because the antenna signal is fed through the coaxial cable 4 from the side of the dielectric carrier board 2, the impact of the coaxial cable 4 on the surface current of the radiating metal surface is reduced. The inner conductor 41 can be, but is not limited to, silver-plated copper conductors. The first insulating layer 43 can be, but is not limited to, polytetrafluoroethylene insulation. The outer conductor 42 can be, but is not limited to, silver-plated copper wire winding layers. The second insulating layer 44 can be, but is not limited to, polyvinyl chloride insulation. The exposed inner conductor 41 can be electrically connected to the second radiator 32, and the exposed outer conductor 42 can be electrically connected to the first radiator 31 through soldering.

In this embodiment, the dipole antenna 1 achieves its function by the spacing of the first radiator 31, the second radiator 32, and the Balun line 33 on the carrier board surface 201 of the dielectric carrier board 2. The Balun line 33 is positioned between the first radiator 31 and the second radiator 32. The inner conductor 41 of the coaxial cable 4 is electrically connected to the second radiator 32, and the outer conductor 42 of the coaxial cable 4 is electrically connected to the first radiator 31. Both ends of the Balun line 33 are connected to the first short segment 311 of the first radiator 31 and the second short segment 321 of the second radiator 32 on either side. This configuration causes the first short segment 311 of the first radiator 31 and the second short segment 321 of the second radiator 32 to generate a second resonant mode at 5 GHz, while the first long segment 312 of the first radiator 31 and the second long segment 322 of the second radiator 32 generate the first resonant mode at 2.4 GHz and the third resonant mode at 6 GHz. Therefore, this embodiment of the dipole antenna 1 can meet the communication requirements of the 2.4 GHz, 5 GHz, and 6 GHz frequency bands with a reduced overall size. It features a simple structure, is easy to manufacture, and can be applied to various wireless communication devices. Additionally, due to the inductive effect produced by the inner conductor 41 of the coaxial cable 4, the length of the first radiator 31 on the carrier board surface 201 can be significantly reduced. This effectively decreases the antenna size from 55 mm to 32 mm, achieving a 42% reduction in size.

Figure 3:
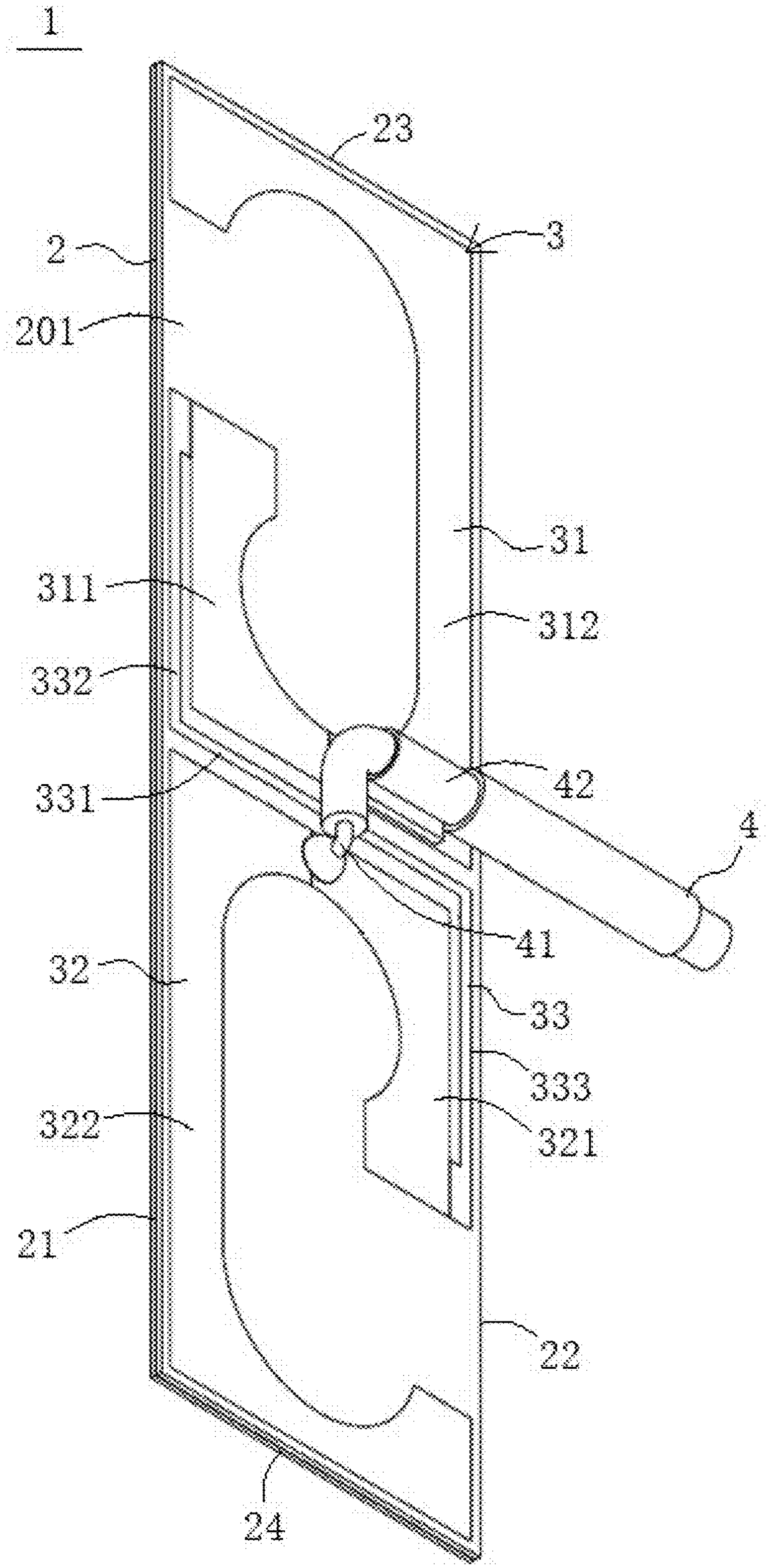
FIG. 3 is a perspective view of the dipole antenna according to the second embodiment of the present application.
Figure 4:
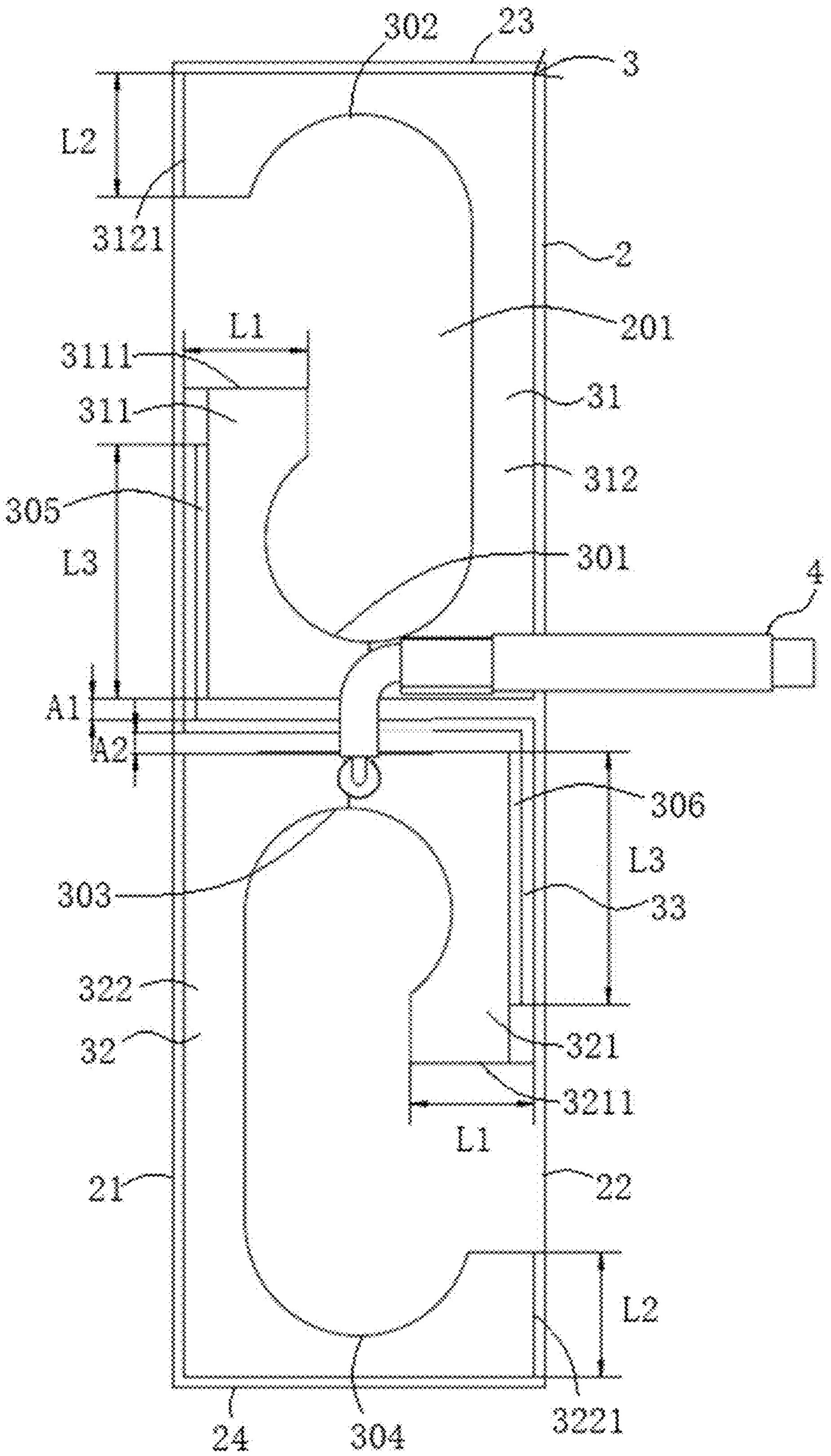
FIG. 4 is a front view of the dipole antenna according to the second embodiment of the present application.
Figure 5:
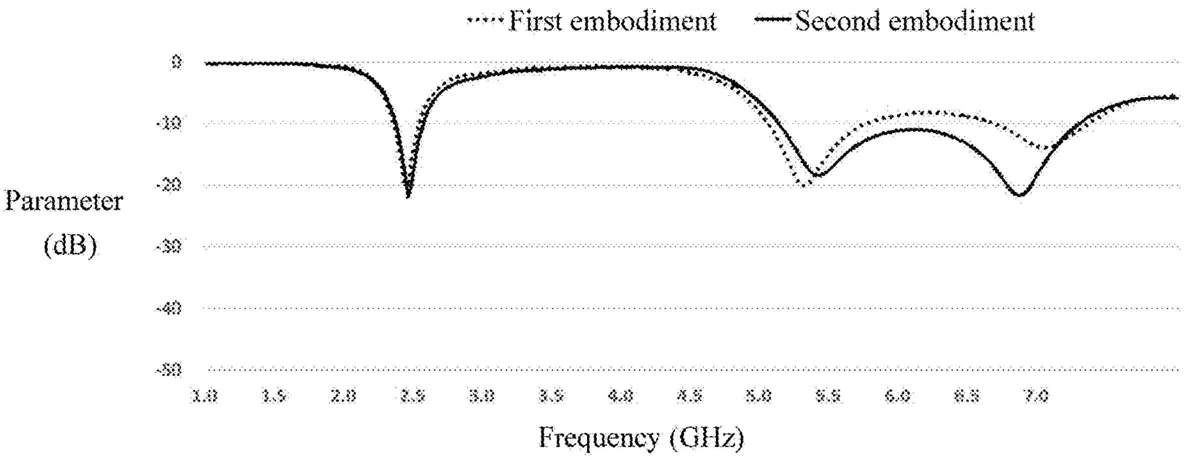
FIG. 5 is a parameter curve diagram of the dipole antenna according to the first and second embodiments.

Please refer to FIGS. 3 to 5. FIG. 3 is a perspective view of the dipole antenna in the second embodiment of the present application. FIG. 4 is a front view of the dipole antenna in the second embodiment, and FIG. 5 is a parameter curve diagram of the dipole antenna in the first and second embodiments. As shown, the difference in this embodiment compared to the first embodiment lies in the connection positions of the two ends of the Balun line 33 with the first short segment 311 and the second short segment 321. In this embodiment, the Balun line 33 includes a main segment 331, a first connecting segment 332, and a second connecting segment 333. The main segment 331 is located between the first radiator 31 and the second radiator 32. The Balun line 33 has a first gap A1 between the main segment 331 and the first radiator 31 and a second gap A2 between the main segment 331 and the second radiator 32. The gap distances of the first gap A1 and the second gap A2 are the same. Both ends of the main segment 331 are connected to the first connecting segment 332 and the second connecting segment 333. The first connecting segment 332 and the second connecting segment 333 are perpendicular to the main segment 331. The first connecting segment 332 is connected to the first short segment 311 and extends along the outer side of the first short segment 311. One end of the first connecting segment 332 is connected to the first short segment 311. The inner side of the first connecting segment 332 and the first short segment 311 have a first channel 305. The length range of the first channel 305 is 0-6 mm. The second connecting segment 333 is connected to the second short segment 321 and extends along the outer side of the second short segment 321. One end of the second connecting segment 333 is connected to the second short segment 321. The inner side of the second connecting segment 333 and the second short segment 321 have a second channel 306. The length range of the second channel 306 is 0-6 mm. Both the second channel 306 and the first channel 305 have the same channel length L3. In this embodiment, the Balun line 33 increases the total length of the Balun line by adding the first connecting segment 332 and the second connecting segment 333 at both ends of the main segment 331, extending towards the first short segment 311 and the second short segment 321, respectively. Additionally, in this embodiment, the first connecting segment 332 and the first short segment 311, and the second connecting segment 333 and the second short segment 321, respectively form the first channel 305 and the second channel 306, creating a slotted design between the main radiators, thereby achieving good matching for the third resonance mode (as shown in FIG. 5).

Please refer again to FIG. 5. In comparison to the parameter curve diagram of the first embodiment, the first and second resonance modes of this embodiment are similar to those of the first embodiment, but the third resonance mode of this embodiment has a better effect than that of the first embodiment. The dipole antenna of the second embodiment is a preferred embodiment, and a further detailed description of the antenna structure in the second embodiment is provided below.

Please refer again to FIG. 4. In this embodiment, the dielectric carrier board 2 is a rectangular carrier board, with the dielectric carrier board 2 having a first side 21, a second side 22, a third side 23, and a fourth side 24. The long sides of the radiating structure 3 are the first side 21 and the second side 22. The side adjacent to one end of the first radiator 31 is the third side 23, and the side adjacent to one end of the second radiator 32 is the fourth side 24. The first short segment 311 is adjacent to the first side 21, the first long segment 312 is adjacent to the second side 22, the second long segment 322 is adjacent to the first side 21, and the second short segment 321 is adjacent to the second side 22. The first short segment 311 of the first radiator 31 and the second long segment 322 of the second radiator 32 are adjacent to the first side 21, while the first long segment 312 of the first radiator 31 and the second short segment 321 of the second radiator 32 are adjacent to the second side 22.

As described above, the outer side edge of the first short segment 311 is set along the first side 21. The outer side edge of the first long segment 312 extends along the second side 22 and the third side 23, extending to the corner of the third side 23 and the first side 21. The outer side edge of the first long segment 312 forms a mirrored "F" shape. The inner side edge of the first short segment 311 is connected to the inner side edge of the first long segment 312. The inner side edge of the first short segment 311 near the Balun line 33 and the inner side edge of the first long segment 312 form a first curved edge 301. The inner side edge of the first long segment 312 near the third side 23 forms a second curved edge 302. Both the first curved edge 301 and the second curved edge 302 are arc-shaped. The outer side edge of the second short segment 321 is set along the first side 21. The outer side edge of the second long segment 322 extends along the first side 21 and the fourth side 24, extending to the corner of the fourth side 24 and the second side 22. The outer side edge of the second long segment 322 forms an inverted "F" shape. The inner side edge of the second long segment 322 is connected to the inner side edge of the second short segment 321. The inner side edge of the second long segment 322 near the Balun line 33 and the inner side edge of the second short segment 321 form a third curved edge 303. The inner side edge of the second long segment 322 near the fourth side 24 forms a fourth curved edge 304. Both the third curved edge 303 and the fourth curved edge 304 are arc-shaped. In this embodiment, the first radiator 31 and the second radiator 32 are mirrored and flipped structures, with the first short side 3111 and the second short side 3211 being of the same length, and the first long side 3121 and the second long side 3221 also being of the same length. The outer side edge lengths of the first long segment 312 of the first radiator 31 and the second long segment 322 of the second radiator 32 are the same.

Additionally, the end side of the first short segment 311, farthest from the second radiator 32, is the first short side 3111, and the end side of the second short segment 321, farthest from the first radiator 31, is the second short side 3211. Both the first short side 3111 and the second short side 3211 have the same side length L1. Moreover, the outer side edge of the first long segment 312 extending to the side edge of the first side 21 is the first long side 3121, and the outer side edge of the second long segment 322 extending to the side edge of the second side 22 is the second long side 3221. Both the first long side 3121 and the second long side 3221 have the same side length L2.

Figure 6:
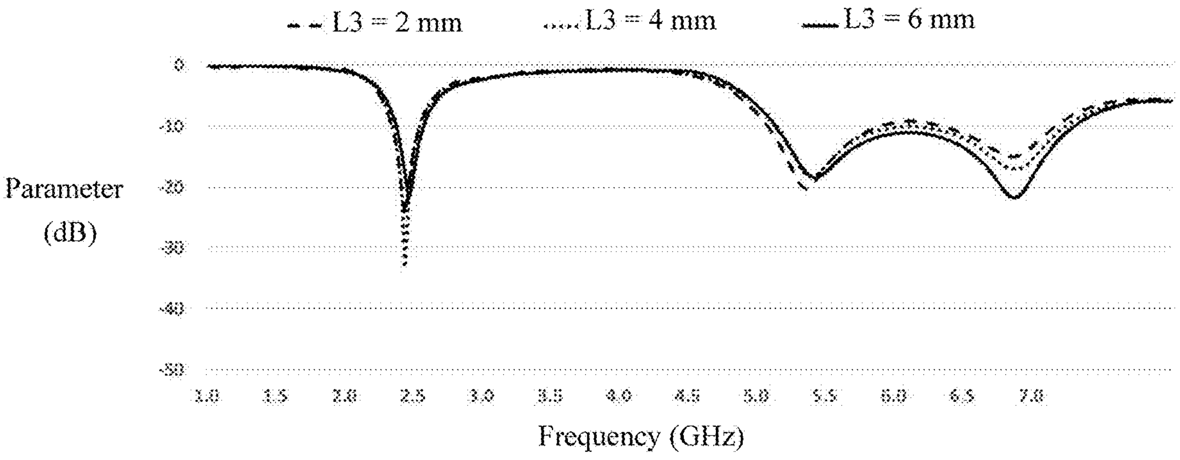
FIG. 6 is a parameter curve diagram of the channel lengths of the first channel and the second channel of the dipole antenna.

Please also refer to FIG. 6, which shows the parameter curve diagram of the channel lengths of the second channel and the first channel. As shown, the difference in this embodiment compared to the second embodiment lies in the adjustment of the channel lengths of the first channel 305 and the second channel 306. The first resonance mode (2.4 GHz), the second resonance mode (5 GHz), and the third resonance mode (6 GHz) of the dipole antenna 1 of this embodiment are adjusted by variation of the channel lengths of the first channel 305 and the second channel 306. The parameter influence on the third resonance mode is significant. Considering the comprehensive effects of the three resonance modes mentioned above, the preferred channel length L3 for the first channel 305 and the second channel 306 is 4 mm.

Figure 7:
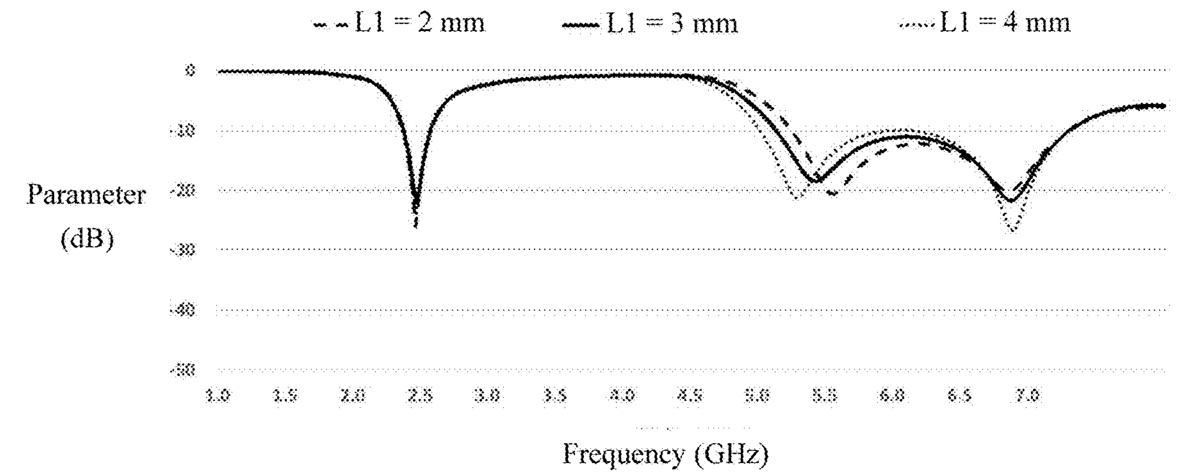
FIG. 7 is a parameter curve diagram of the side lengths of the first short side and the second short side of the dipole antenna.

Please refer to FIG. 7, which shows the parameter curve diagram of the side lengths of the first short side and the second short side of the dipole antenna. As shown, the difference in this embodiment compared to the second embodiment lies in the adjustment of the side lengths L1 of the first short side 3111 and the second short side 3211. In this embodiment, the first resonance mode (2.4 GHz), the second resonance mode (5 GHz), and the third resonance mode (6 GHz) of the dipole antenna 1 is adjusted by variation of the side lengths L1 of the first short side 3111 of the first short segment 311 of the first radiator 31 and the second short side 3211 of the second short segment 321 of the second radiator 32. The parameter influence on the second and third resonance modes is significant. Considering the comprehensive effects on the three resonance modes mentioned above, the preferred side length L1 of the first short side 3111 and the second short side 3211 is 3 mm and is within the range of 2.5 mm to 3.5 mm.

Figure 8:
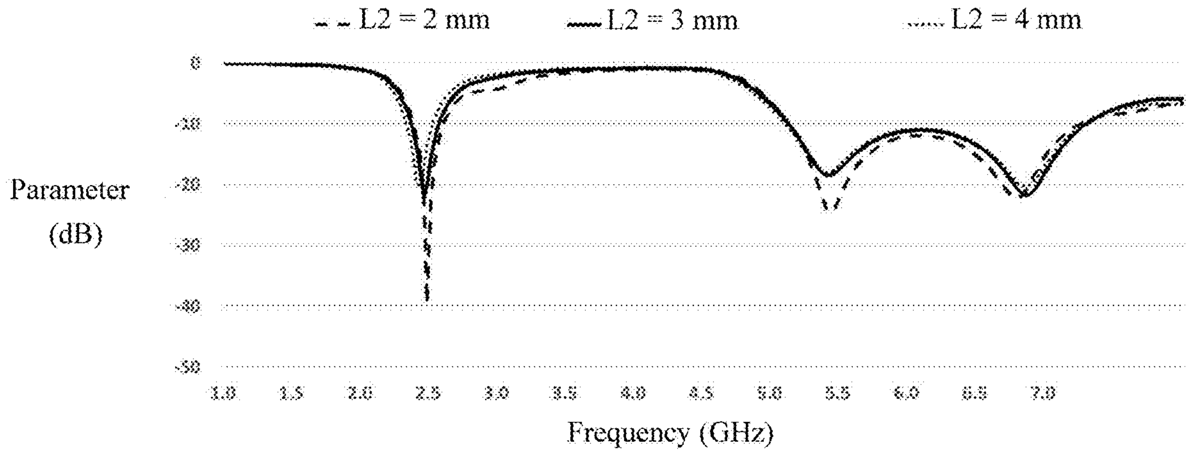
FIG. 8 is a parameter curve diagram of the side lengths of the first long side and the second long side of the dipole antenna.

Please refer to FIG. 8, which shows the parameter curve diagram of the side lengths of the first long side and the second long side of the dipole antenna. As shown, the difference in this embodiment compared to the second embodiment lies in the adjustment of the side lengths L2 of the first long side 3121 and the second long side 3221. In this embodiment, the first resonance mode (2.4 GHz), the second resonance mode (5 GHz), and the third resonance mode (6 GHz) of the dipole antenna 1 is adjusted by variation of the side lengths L2 of the first long side 3121 of the first long segment 312 of the first radiator 31 and the second long side 3221 of the second long segment 322 of the second radiator 32. The parameters significantly impact the first and second resonance modes. Considering the performance of all three resonance modes, and with the side length L2 of the first long side 3121 and the second long side 3221 ranging between 2 mm and 4 mm, the preferred side length L2 for the first long side 3121 and the second long side 3221 is 3 mm.

Figure 9:
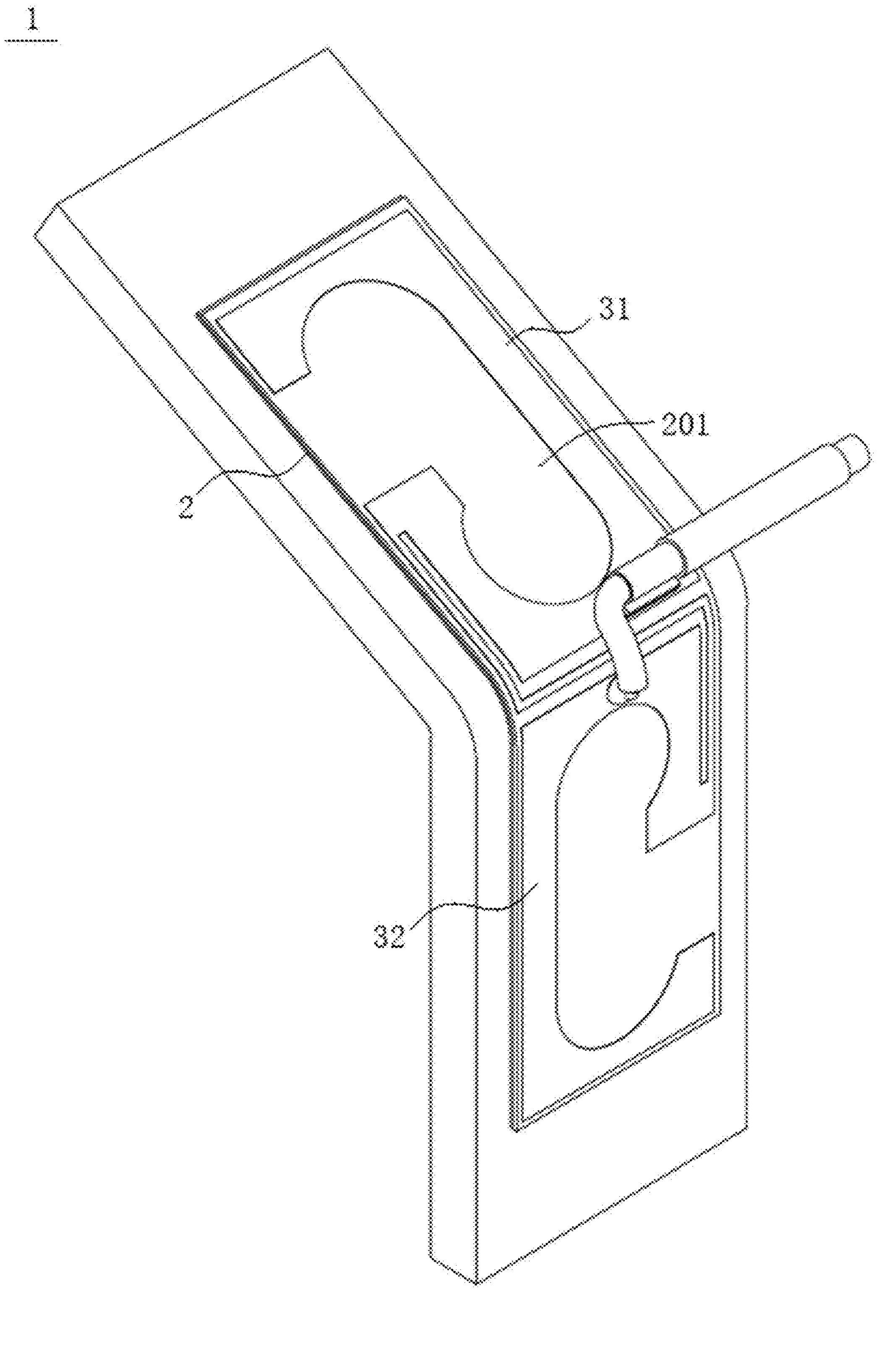
FIG. 9 is a perspective view of the dipole antenna according to the third embodiment of the present application.

Please refer to FIG. 9, which is a perspective view of the dipole antenna in the third embodiment of the present application. As shown, the difference in this embodiment compared to the second embodiment lies in the structural shape of the dielectric carrier board 2 set between the first radiator 31 and the second radiator 32. In this embodiment, there is a relative angle between the first radiator 31 and the second radiator 32, meaning that the carrier board surface 201 is a bent surface. The first radiator 31 is located on one plane of the bent surface, while the second radiator 32 is located on the other plane. This bent surface can bend inward or outward such that the dipole antenna 1 in this embodiment can be applied to a variety of product types.

Figure 10:
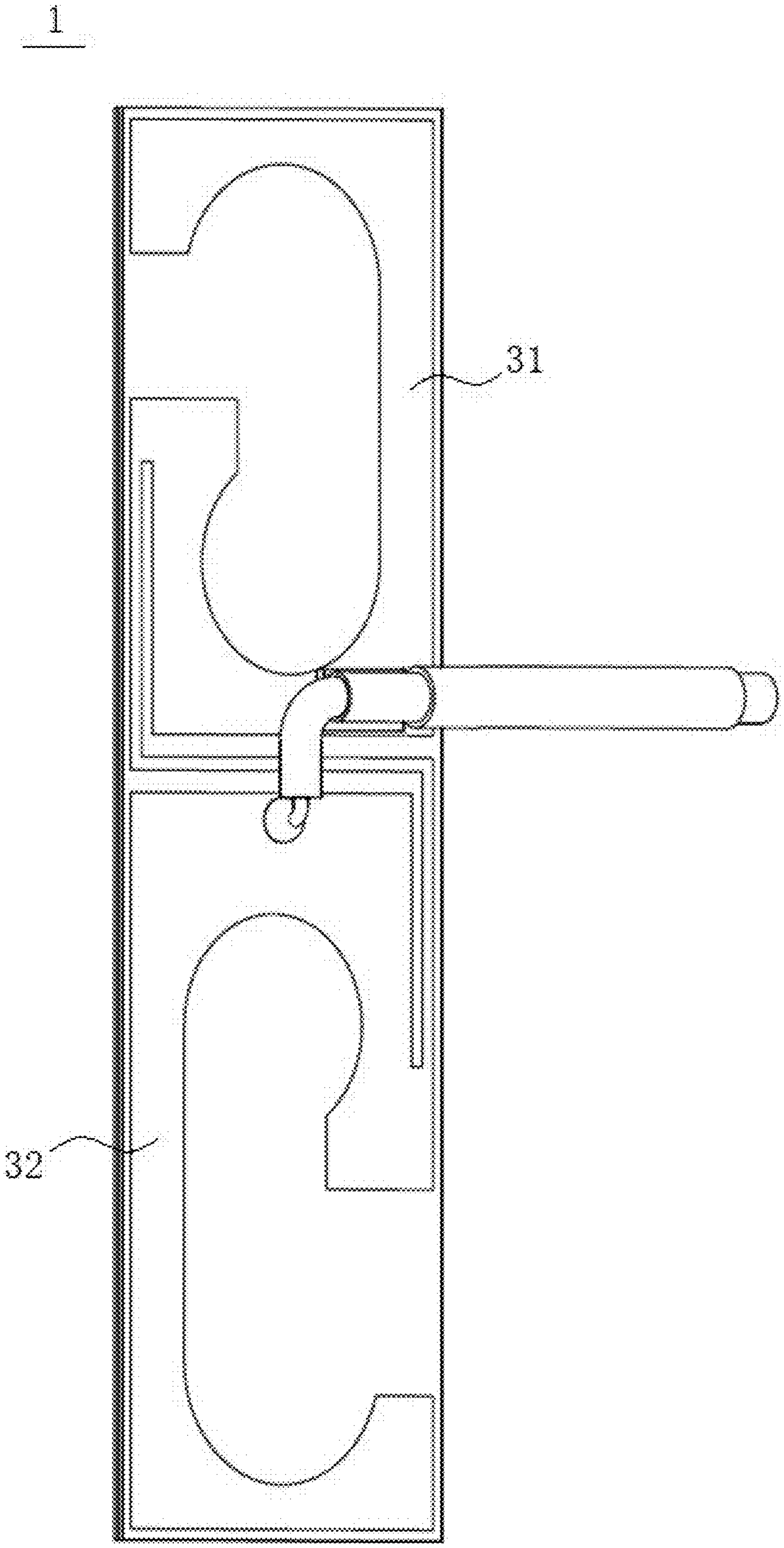
FIG. 10 is a perspective view of the dipole antenna according to the fourth embodiment of the present application.

Please refer to FIG. 10, which is a perspective view of the dipole antenna in the fourth embodiment of the present application. As shown, the difference in this embodiment compared to the second embodiment lies in the different length ratios of the first radiator 31 and the second radiator 32. In this embodiment, the input impedance of the dipole antenna 1 can be fine-tuned and the antenna matching adjusted by adjustment of the length ratio of the first radiator 31 and the second radiator 32. The length ratio of the first radiator 31 and the second radiator 32 is between 1.1:0.9 and 0.9:1.1. In other words, the length ratio of the outer side edges of the first long segment 312 of the first radiator 31 and the second long segment 322 of the second radiator 32 is between 1.1:0.9 and 0.9:1.1. This allows the adjustment of the effects of the first resonance mode (2.4 GHz), the second resonance mode (5 GHz), and the third resonance mode (6 GHz) according to the user's needs.

Figure 11:
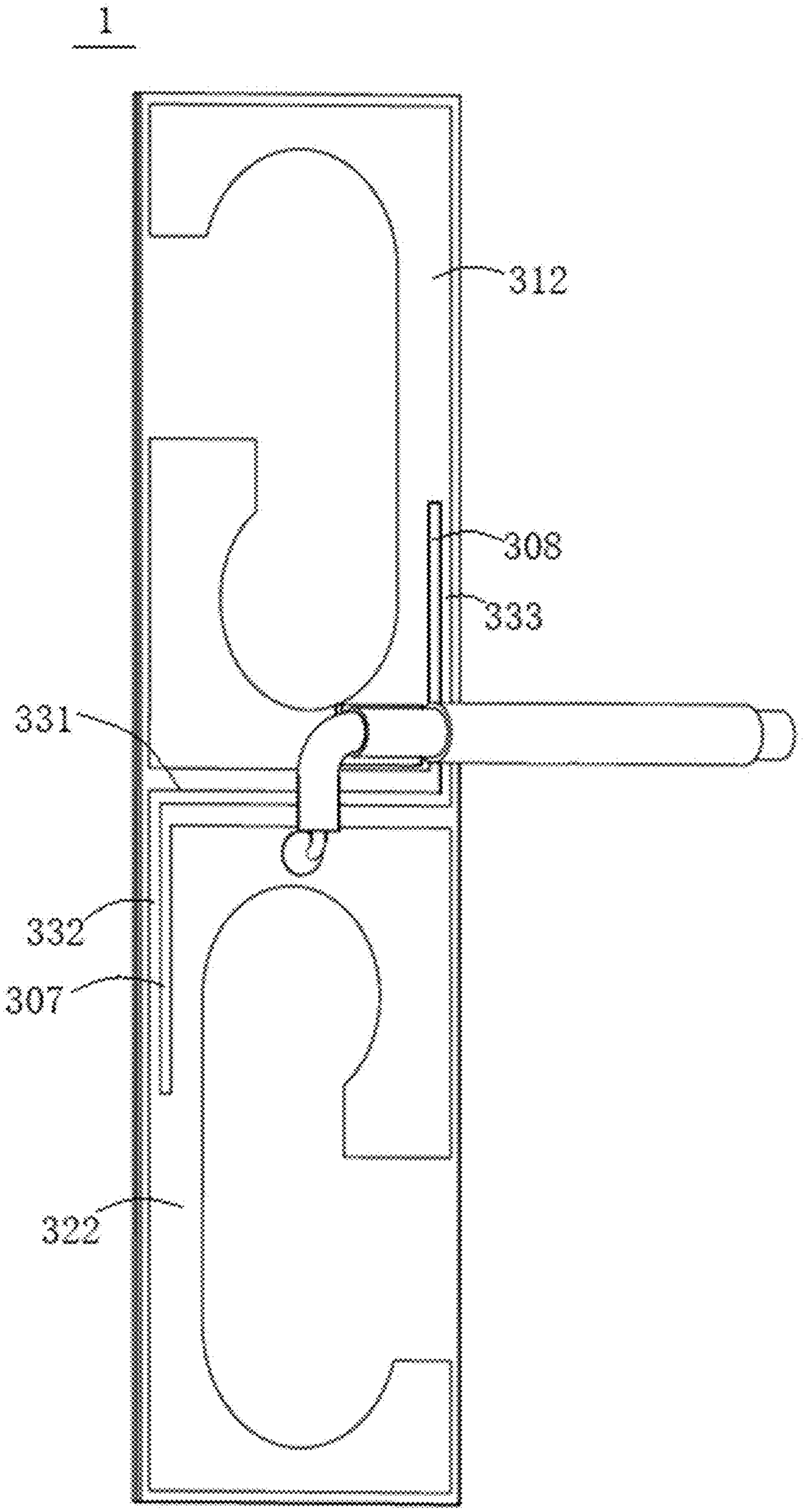
FIG. 11 is a perspective view of the dipole antenna according to the fifth embodiment of the present application.

Please refer to FIG. 11, which shows a perspective view of the dipole antenna in the fifth embodiment of the present application. As shown, the difference in this embodiment compared to the second embodiment lies in the connections of the two ends of the Balun line 33 to the first long segment 312 and the second long segment 322, respectively, on both sides. In this embodiment, the first connecting segment 332 of the Balun line 33 connects to the second long segment 322. The first connecting segment 332 extends along the outer side of the second long segment 322, and one end of the first connecting segment 332 connects to the second long segment 322. The inner side of the first connecting segment 332 and the second long segment 322 form the third channel 307, with a length range of 0-6 mm. The second connecting segment 333 of the Balun line 33 connects to the first long segment 312. The second connecting segment 333 extends along the outer side of the first long segment 312, and one end of the second connecting segment 333 connects to the first long segment 312. The inner side of the second connecting segment 333 and the first long segment 312 form the fourth channel 308, with a length range of 0-6 mm. In other words, the Balun line 33 in this embodiment forms a mirror image structure compared to the Balun line in the second embodiment, thus enabling fine-tuning of the input impedance and adjustment of the antenna matching.

Figure 12:
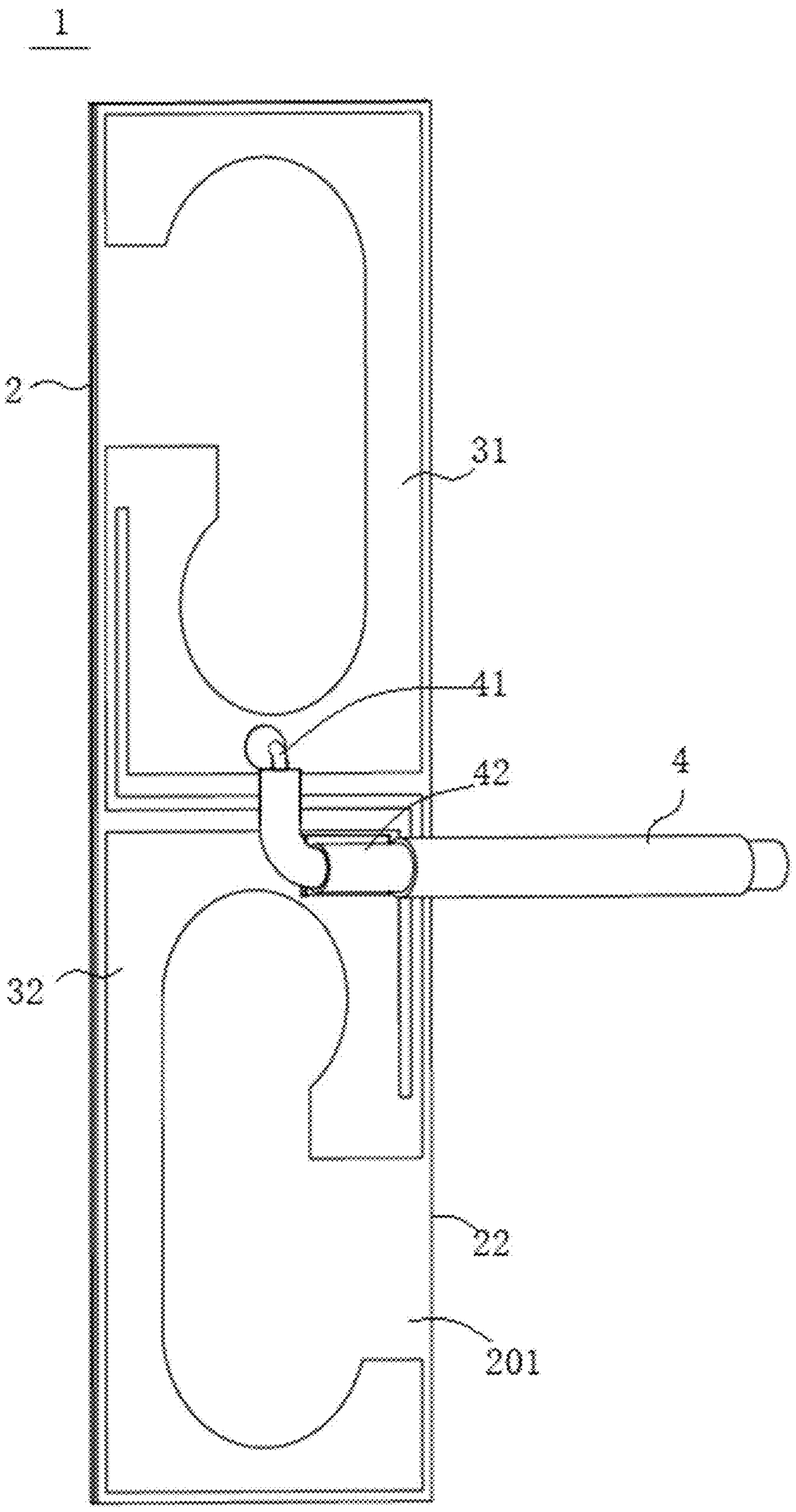
FIG. 12 is a perspective view of the dipole antenna according to the sixth embodiment of the present application.

Please refer to FIG. 12, which shows a perspective view of the dipole antenna in the sixth embodiment of the present application. As shown, the difference in this embodiment compared to the second embodiment lies in the signal feeding direction of the coaxial cable 4. In this embodiment, one end of the coaxial cable 4, which has an exposed inner conductor 41 and an exposed outer conductor 42, extends perpendicularly from the second side 22 of the dielectric carrier board 2 into the area above the carrier board surface 201 and bends upward at 90 degrees. The exposed inner conductor 41 is electrically connected to the first radiator 31, and the exposed outer conductor 42 is electrically connected to the second radiator 32, thereby achieving a conversion/mirror of the signal feeding direction.

In summary, the present application provides a dipole antenna. Because the first radiator, the second radiator, and the Balun line (located between the first radiator and the second radiator) are set on the carrier board surface of the dielectric carrier board with intervals, the inner conductor of the coaxial cable is electrically connected to the second radiator, the outer conductor of the coaxial cable is electrically connected to the first radiator, and both ends of the Balun line are connected between the first short segment of the first radiator and the second short segment of the second radiator on both sides, respectively. This causes the first short segment of the first radiator and the second short segment of the second radiator to generate a second resonance mode (5 GHz), and the first long segment of the first radiator and the second long segment of the second radiator to generate a first resonance mode (2.4 GHz) and a third resonance mode (6 GHz). Therefore, the dipole antenna in this embodiment of the application can meet the communication needs of the 2.4 GHz, 5 GHz, and 6 GHz bands with a reduced overall size, a simple structure, and easy fabrication process, so it is applicable to a variety of wireless communication devices.

It should be noted that in this document, the terms "include" and "comprise," and any variations thereof, are intended to cover a non-exclusive inclusion, such that a process, method, article, or apparatus comprising a list of elements not only includes those elements but may also include other elements not expressly listed or inherent to such process, method, article, or apparatus. Without further limitations, elements defined by the phrase "comprising a . . . " do not exclude the presence of additional identical elements in the process, method, article, or apparatus that comprises the element.

It should be noted that the embodiments described above are examples of the present invention rather than limitations of the present invention. Any variation without departing from the fundamental structure of the invention is to be encompassed within the scope of protection in accordance with the broadest interpretation of the appended claims.

What is claimed is:

1. A dipole antenna, comprising:

a dielectric carrier board, including a carrier board surface;

a radiating structure disposed on the carrier board surface, the radiating structure comprising a first radiator, a second radiator, and a Balun line, wherein the Balun line is positioned between the first radiator and the second radiator; wherein the first radiator comprises a first short segment and a first long segment, with the first short segment and the first long segment arranged side by side and adjacent to one side of the Balun line, and the first long segment extending in a direction away from the Balun line; wherein the second radiator comprises a second short segment and a second long segment, with the second short segment and the second long segment arranged side by side and adjacent to the other side of the Balun line, and the second long segment extending in a direction away from the Balun line; wherein the position of the first short segment corresponds to the position of the second long segment, and the position of the first long segment corresponds to the position of the second short segment; wherein the two ends of the Balun line are respectively connected between the first short segment and the second short segment or between the first long segment and the second long segment on both sides; and a coaxial cable, comprising an inner conductor and an outer conductor, wherein the outer conductor is located outside the inner conductor; the inner conductor is electrically connected to the second radiator, and the outer conductor is electrically connected to the first radiator.

2. The dipole antenna as claimed in claim 1, wherein the dielectric carrier board has a first side, a second side, a third side, and a fourth side, the long sides of the radiating structure are respectively the first side and the second side, the end side adjacent to one end of the first radiator is the third side, the end side adjacent to one end of the second radiator is the fourth side, the first short segment is adjacent to the first side, the first long segment is adjacent to the second side, the second long segment is adjacent to the first side, and the second short segment is adjacent to the second side.

3. The dipole antenna as claimed in claim 2, wherein an outer edge of the first short segment is disposed along the first side, an outer edge of the first long segment extends along the second side and the third side, the outer edge of the first long segment extends to the corner between the third side and the first side, an outer edge of the second long segment extends along the first side and the fourth side, the outer edge of the second long segment extends to the corner between the fourth side and the second side, and an outer edge of the second short segment is disposed along the first side.

4. The dipole antenna as claimed in claim 3, wherein an inner edge of the first short segment is connected to an inner edge of the first long segment; the inner edge of the first short segment adjacent to the Balun line and the inner edge of the first long segment form a first curved edge; the inner edge of the first long segment adjacent to the third side forms a second curved edge.

5. The dipole antenna as claimed in claim 3, wherein an inner edge of the second long segment is connected to an inner edge of the second short segment, the inner edge of the second long segment adjacent to the Balun line and the inner edge of the second short segment form a third curved edge;

the inner edge of the second long segment adjacent to the fourth side forms a fourth curved edge.

6. The dipole antenna as claimed in claim 3, wherein the end side of the first short segment that is distal from the second radiator is a first short side, the end side of the second short segment that is distal from the first radiator is a second short side, and the lengths of the first short side and the second short side are the same.

7. The dipole antenna as claimed in claim 6, wherein the length of the first short side and the second short side ranges from 2.5 mm to 3.5 mm.

8. The dipole antenna as claimed in claim 3, wherein the outer edge of the first long segment extending to the side of the first side is a first long side, and the outer edge of the second long segment extending to the side of the second side is a second long side, and the lengths of the first long side and the second long side are the same.

9. The dipole antenna as claimed in claim 8, wherein the length of the first long side and the second long side ranges from 2 mm to 4 mm.

10. The dipole antenna as claimed in claim 1, wherein the Balun line comprises a main segment, a first connecting segment, and a second connecting segment; both ends of the main segment are respectively connected to the first connecting segment and the second connecting segment; the first connecting segment and the second connecting segment are perpendicular to the main segment.

11. The dipole antenna as claimed in claim 10, wherein the first connecting segment is connected to the first short segment and the second connecting segment is connected to the second short segment; the first connecting segment extends along the outer side of the first short segment, with one end of the first connecting segment connected to the first short segment; the inner side of the first connecting segment and the first short segment form a first channel; the second connecting segment extends along the outer side of the second short segment, with one end of the second connecting segment connected to the second short segment; the inner side of the second connecting segment and the second short segment form a second channel.

12. The dipole antenna as claimed in claim 11, wherein the length of the first channel and the second channel ranges from 0 to 6 mm.

13. The dipole antenna as claimed in claim 10, wherein the first connecting segment is connected to the second long segment, and the second connecting segment is connected to the first long segment; the first connecting segment extends along the outer side of the second long segment, with one end of the first connecting segment connected to the second long segment; the inner side of the first connecting segment and the second long segment form a third channel; the second connecting segment extends along the outer side of the first long segment, with one end of the second connecting segment connected to the first long segment; the inner side of the second connecting segment and the first long segment form a fourth channel.

14. The dipole antenna as claimed in claim 13, wherein the length of the third channel and the fourth channel ranges from 0 to 6 mm.

15. The dipole antenna as claimed in claim 10, wherein a first gap is present between the main segment of the Balun line and the first radiator and a second gap is present between the main segment of the Balun line and the second radiator, wherein the first gap and the second gap have the same spacing distance.

16. The dipole antenna as claimed in claim 1, wherein a length ratio of the first radiator to the second radiator ranges from 1.1:0.9 to 0.9:1.1.

17. The dipole antenna as claimed in claim 1, wherein the first short segment and the second short segment generate a second resonant mode, and the first long segment and the second long segment generate a first resonant mode and a third resonant mode.

18. The dipole antenna as claimed in claim 1, wherein the first radiator and the second radiator have the same structure but are inverted vertically and flipped horizontally relative to each other.

19. The dipole antenna as claimed in claim 1, wherein the first radiator, the second radiator, and the Balun line are formed on the carrier board surface of the dielectric carrier board by printing, and the first radiator, the second radiator, and the Balun line are integrally formed.

20. The dipole antenna as claimed in claim 1, wherein one end of the coaxial cable extends from an outside of the dielectric carrier board to a point above the carrier board surface of the dielectric carrier board, and this end of the coaxial cable is connected to the radiating structure.

21. The dipole antenna as claimed in claim 20, wherein one end of the coaxial cable extends perpendicularly from a long side of the dielectric carrier board to a point above the carrier board surface of the dielectric carrier board and is bent 90 degrees to connect to the radiating structure.

22. The dipole antenna as claimed in claim 1, wherein the coaxial cable further includes a first insulating layer and a second insulating layer; wherein the first insulating layer covers part of the surface of the inner conductor, leaving one end of the inner conductor exposed, and the exposed inner conductor is electrically connected to the second radiator; the outer conductor covers part of the surface of the first insulating layer, and the second insulating layer covers part of the surface of the outer conductor, leaving part of the outer conductor exposed, and the exposed outer conductor is electrically connected to the first radiator.

23. The dipole antenna as claimed in claim 1, wherein the first radiator and the second radiator are on the same plane or form a relative angle.

* * * * *